June 7, 1960  S. J. KONTIS  2,939,264
RETRACTILE CUTTER BLADES ASSEMBLY FOR LAWN MOWERS
Filed May 5, 1958

INVENTOR
SOTOS J. KONTIS
BY
ATTORNEYS

United States Patent Office 2,939,264
Patented June 7, 1960

2,939,264
RETRACTILE CUTTER BLADES ASSEMBLY FOR LAWN MOWERS

Sotos J. Kontis, 722 Stiles Ave., Tallahassee, Fla.

Filed May 5, 1958, Ser. No. 732,954

1 Claim. (Cl. 56—295)

This invention relates to lawn mowers, and more particularly to retractile cutter blade assemblies for lawn mowers.

In a class of lawn mowers, the cutter blades are carried by and extend outwardly from a rotary support, such as a plate, with the plate generally rotating on a vertical axis, whereby the sweep of the blades is horizontal.

An important object of the invention is to provide a retractile cutter blade assembly for lawn mowers in which the blades normally extend radially from the rotary support and are retained extended by centrifugal force during normal cutting operations but, when a blade encounters an object which blocks its path and cannot be severed, the blade will move out of the path of the object and thus prevent damage to the blade and/or the support or means, as a motor, for rotating the support.

Another important object is to provide a retractile cutter blade assembly in which not only the blade that encounters an object which it cannot sever, but all other blades of the assembly, will retract to the same degree and thus maintain the balance of the assembly as a whole. This will prevent wear on bearings and eliminate a jerky operation of the assembly.

A further important object is to provide an assembly as stated which is easily disassembled for repairs or replacements, and includes no complicated parts or parts apt to get out of order.

Furthermore, an important object is to provide a double-edged retractile blade which may be turned over and an unused cutting edge positioned so as to function during operation of the assembly.

Other objects and advantages of the invention will be apparent during the course of the following detailed description of the invention, taken in connection with the accompanying drawing, forming a part of this disclosure, and in which drawing.

In the drawing, wherein for the purpose of illustration is shown a preferred embodiment of the invention and wherein similar reference characters designate corresponding parts throughout the several views, the letter A designates a vehicle, and B the retractile cutter blade assembly.

Figures 3, 4:
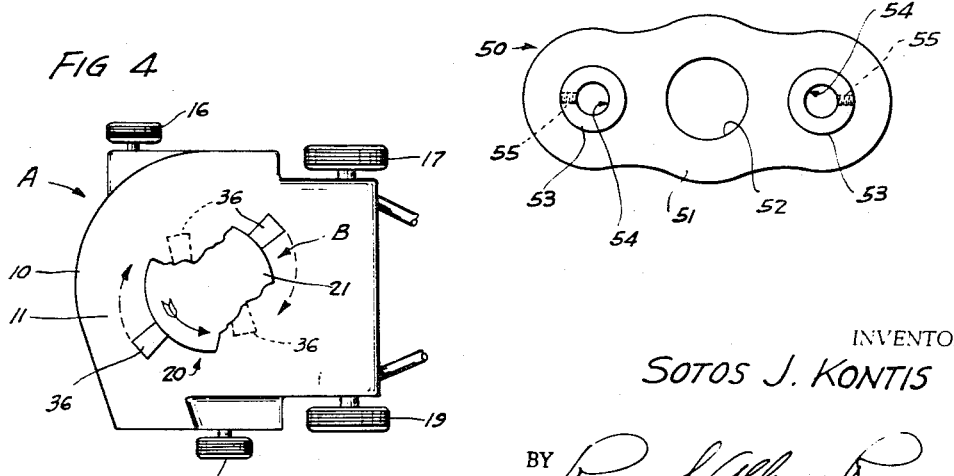
Fig. 3 is a top plan view of a blade retaining yoke of the assembly.
Fig. 4 is a bottom plan view of a power mower equipped with the retractile cutter blade assembly.

The vehicle A is shown as a conventional power driven lawn mower, including a chassis 10 having a floor plate 11, the bottom face of which is shown in Fig. 4, and which chassis supports means 12 (Fig. 1) for rotating the retractile cutter blade assembly B. Such means may be a conventional internal combustion engine (not shown) with conventional rotor connection with the assembly B by way of the shaft 13, which extends downwardly through the floor plate 11, and coupling member 14, which extends below the floor plate and which is shown, by way of example, as a plate integral with the shaft and provided with a plurality of bolt shank-accommodating openings 15 or the like. The chassis 10 is shown as movable in a horizontal plane on ground rollers 16, 17, 18 and 19, while the coupling member 14 rotates on a vertical axis.

The retractile cutter blade assembly B includes support means 20 which is shown as a rotatable body portion 21, which is preferably a circular plate or disc having a substantially flat upper face 22 from which extends upwardly an axially-disposed spindle or pivot member 23, and a plurality of spaced-apart spindles or pivots, such as 24 and 25, disposed between the central spindle 22 and the peripheral edge 26 of the body portion 21. In the example shown, there are two spaced-apart pivots. They are spaced-apart at 180°. In addition, there are a plurality of stops, such as the stops 27, 28, 29 and 30, which are adapted to limit movement of the cutter blades to be subsequently described. The stops 27 and 28 are adapted to cause the blades to take positions radially of the body portion 21, when the cutter is in rotation, and the stops 29 and 30 limit retraction of the blades.

Swingably supported by the means 20 are the cutter means 35, which in the example shown, are two substantial elongated blades 36. The blades are substantially alike in weight, shape and size and gradually increase in width from their inner ends 37' to their outer ends 37, with the two cutting edges 38 of each blade diverging toward the outer end 37 of the respective blade. This provides a blade best suited for centrifugal action. Preferably integral with each blade is a sector gear 39, with the teeth 44 thereof extending for at least 180° and preferably, somewhat beyond 180° as may be seen in Fig. 2. Each sector gear is provided with a vertical opening 40 to accommodate either of the spindles 24 or 25 for rotation of the sector gear. It will be noted that means 41 is provided to indicate the relative positions of the sector gears with the central gear 42 to be described. For example, the means 41 may be small indentations on both side faces of two adjacent teeth 44. The two indentations of each sector gear are spaced a subsequently equal distance from the longitudinal axis of the blade, which axis intersects the axis of rotation of the sector gear. The central gear 42 is mounted for rotation upon the spindle 23 and its teeth 43 mesh with the teeth 44 of the sector gears 39. It will be noted that means 46 are provided on the central gear to assist in positioning the blades 36 correctly (with their longitudinal axis in alignment). The means 46 may be slight indentations in two upper side faces of teeth 43 disposed 180° apart. By positioning the means 41 and 44 as in Fig. 2, proper positioning of the blades are assured. There is provided in the upper side face of the gear 42 a socket 45 for securing one end portion of a spring 60 to be later described.

Figure 1:
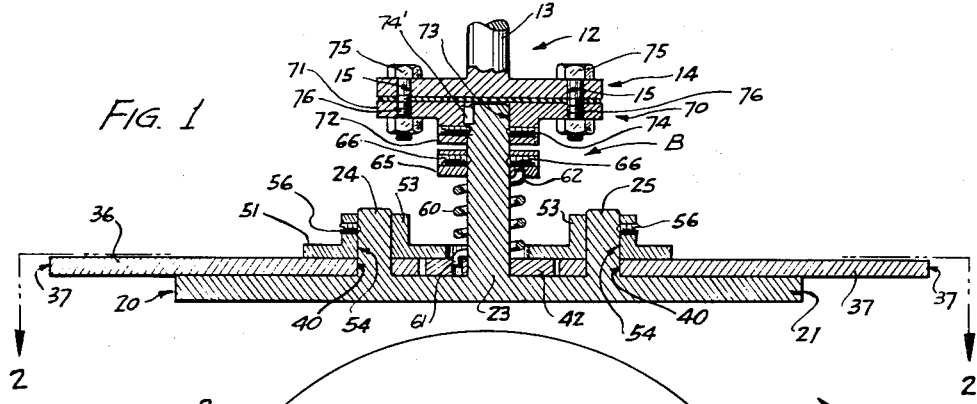
Figure 1 is a vertical sectional view of the retractile cutter blade assembly coupled to a portion of means for rotating the assembly.

Hold down means 50 for the blades 36 may comprise a yoke 51, shown best in Fig. 3, taken with Fig. 1, having a body portion with a circular central opening 52 and upwardly-extending bosses or flanges 53 on either side of and spaced from the opening 52 and each having a circular opening 54, and screw threaded radially-extending openings 55 from the exterior of bosses to the openings 54. The opening 52 is adapted to accommodate both a portion of the spindle 23 as well as the lower portion of the spring 60 and the openings 54 accommodate the upper end portions of the spindles 24. Set screws 56 are adapted to extend through the opening 55 to bear against the spindles 24 when the yoke 51 is in position as in Fig. 1.

Loosely surrounding the lower portion of the spindle 23, is an expansion helical spring 60, one function of which is to cause some resistance of the blades to the cutting operation, having a downturned portion 61 of the lowermost terminal coil and an upturned portion 62 of the uppermost terminal coil. The portion 61 extends into the socket 45 of the gear 42 and the portion 62 is adapted to extend into a downwardly-opening socket of a set collar 65 which encircles an intermediate portion of the spindle 23 and may be adjustably retained thereon by set screws 66 which extend through radially-extending screw-threaded bores through the collar to the spindle and bear thereagainst. By lowering the set collar 65 tension on the spring 60 will be increased and raising the collar will decrease such tension.

Above the set collar 65 is coupling means 70, comprising a body portion which may be a flat disc 71 provided with a central hub or collar 72 integral therewith providing a socket 73 to snugly receive the upper end portion of the spindle 23, and through which radially extend screw-threaded bores to extend set screws 74 to bear against the spindle 23. In addition, I may provide a key 74' carried by the collar 72 and projecting into the socket 73 to fit snugly into a suitable keyway in the free end portion of the spindle 23. By means of nuts and bolt assemblies 75, the means 14 and 70 may be coupled together with portions of the shanks of the bolts extending through aligning openings 76 in the disc 71 and openings 15 in the coupling member 14.

Upon rotation of the shaft 13 and coupling member 14, the plate 21 will also rotate with them and centrifugal force to tend to cause the blades 36 to take the positions as in Fig. 4, and the blades will be in positon to cut. If one blade comes into contact with an obstacle and cannot cut into it, the blade will retract and this will cause a rotation of the sector gear 39 integral therewith which, in turn, will cause a partial rotation of the gear 42 against the tension of the spring 60, and the gear 42 will cause partial rotation of the other sector gear and retraction of the blades integral therewith to a degree of retraction equal to that of the first-mentioned blade. The blades can retract until the edges contact the stops 29 and 30 respectively which contact is sufficient for the blades to clear the obstacle and even cause the blades to clear the periphery 27. Rotation of the gear 42 will cause winding up (causing increased tension upon) the spring 60 but when the obstacle is cleared, the spring will unwind and cause the gear 42 to restore the blades to their fully extended positions.

The connection of the blades with the gear wheel provides a strong connection free of fragile parts or parts apt to lose their ability to function properly, such as springs.

Figure 2:
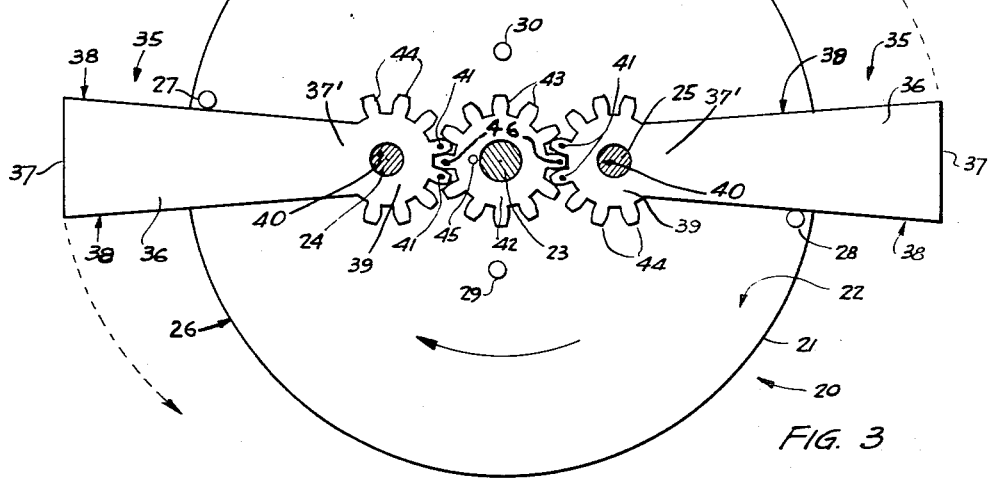
Fig. 2 is a horizontal sectional view, substantially on the line 2—2 of Fig. 1.

With the blades 36 increasing in weight until their greatest weight is at their outer ends, the construction will tend to cause the blades to extend as in Fig. 2, upon rotation of the apparatus B, and maintain their positions so as to cut grass and the like, despite the resistance of the grass to the cutting action of the blades.

Various changes may be made to the form of the invention herein shown and described without departing from the spirit of the invention or scope of the claim.

I claim:

A lawn mower retractile cutter blade assembly including a rotatable disc having an axially-disposed spindle and a plurality of spaced-apart pivot pins extending upwardly in parallelism from one face of said disc; a plurality of double-edged cutter blades, one for each pivot pin, and each blade having cutter portions extending outwardly of said disc and having a sector gear integral therewith at its inner end and rotatably mounted upon a pivot pin, with portions of the lengths of the pivot pins extending through said sector gears and with the free end portions of said pivot pins extending outwardly thereof; a gear wheel rotatably mounted on said spindle and in mesh with all of said sector gears, a yoke having a central opening accommodating a portion of said spindle and with the wall of said central opening spaced from said spindle, said yoke bridging the space between said pivot pins and having a plurality of openings adjacent the outer ends of said yoke to accommodate parts of the free end portions of said pivot pins, and a plurality of upwardly-extending tubular bosses, surrounding each of the last-named openings and accommodating other parts of the free end portions of said pivot pins, each of said bosses being provided with a radially-extending screw-threaded opening therethrough, and a set screw for each of said screw-threaded openings and having free end means for bearing against said pivot pins; means carried by said spindle to couple said assembly to a rotor of a lawn mower; and means to retard rotation of said gear wheel during movement from a first rotative position to a second rotative position and restore said gear wheel to said first position, comprising a set collar longitudinally adjustable of said spindle and adjustably secured thereto and an expansion coil spring disposed about a portion of said spindle between said set collar and said gear wheel and with the one end portion of said spring extending into said central opening and spaced from the wall of said opening and being secured to said gear wheel and the opposite end portion of said spring being secured to said set collar; said bosses extending upwardly with their longitudinal axes in parallelism with the longitudinal axis of said spring and said bosses facing and spaced from said spring.

References Cited in the file of this patent

UNITED STATES PATENTS

| | | |
|---|---|---|
| 2,281,639 | Swan | May 5, 1942 |
| 2,491,544 | Arkenberg | Dec. 20, 1949 |
| 2,654,986 | Gold | Oct. 13, 1953 |
| 2,803,103 | Kollman | Aug. 20, 1957 |
| 2,815,781 | Myrold et al. | Dec. 10, 1957 |